(12) United States Patent
Fall

(10) Patent No.: US 11,964,708 B2
(45) Date of Patent: Apr. 23, 2024

(54) PULLEY SYSTEM FOR VEHICLE POWER STEERING SYSTEM

(71) Applicant: Steering Solutions IP Holding Corporation, Saginaw, MI (US)

(72) Inventor: Christopher A. Fall, Vassar, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 913 days.

(21) Appl. No.: 17/000,859

(22) Filed: Aug. 24, 2020

(65) Prior Publication Data

US 2022/0055684 A1    Feb. 24, 2022

(51) Int. Cl.
*B62D 5/04* (2006.01)
*F16H 7/02* (2006.01)
*F16H 7/08* (2006.01)
*F16H 7/18* (2006.01)

(52) U.S. Cl.
CPC ............ *B62D 5/0424* (2013.01); *F16H 7/02* (2013.01); *F16H 7/08* (2013.01); *F16H 7/18* (2013.01)

(58) Field of Classification Search
CPC .................................................. B62D 5/0424
See application file for complete search history.

(56) References Cited

U.S. PATENT DOCUMENTS

| | | | |
|---|---|---|---|
| 9,933,050 B2 * | 4/2018 | Yamamoto | F16H 37/124 |
| 10,112,593 B2 * | 10/2018 | Pattok | F16H 7/1281 |
| 10,160,480 B2 * | 12/2018 | Pattok | F16H 7/02 |
| 10,322,744 B2 * | 6/2019 | Eickholt | F16H 7/02 |
| 10,948,060 B2 * | 3/2021 | Boksenberg | B62D 5/0448 |
| 10,995,799 B2 * | 5/2021 | Douglas | F16H 55/36 |
| 11,124,222 B2 * | 9/2021 | Harris | B62D 5/0424 |
| 11,242,913 B2 * | 2/2022 | Tsuzuki | C08K 7/02 |
| 11,384,827 B2 * | 7/2022 | Harris | B62D 5/04 |
| 2017/0225705 A1 * | 8/2017 | Tomikawa | F16H 7/023 |

(Continued)

FOREIGN PATENT DOCUMENTS

DE    102016113803 A1    2/2017

OTHER PUBLICATIONS

Website "http://der-weniger.at/shop/motor-mit-spannroller-p-1591.html"; article photo. Copyright of the photo: 2011. (Year: 2011).*

(Continued)

*Primary Examiner* — Minnah L Seoh
*Assistant Examiner* — Ryan Edward Hardy
(74) *Attorney, Agent, or Firm* — Dickinson Wright PLLC

(57) ABSTRACT

A pulley assembly for a steering assembly includes a motor disposed within a motor housing and having a motor shaft extending therefrom. The pulley assembly also includes a motor face plate having a motor pilot component extending therefrom in the same direction as the motor shaft extends away from the motor, the motor shaft extending through a hole in the motor face plate. The pulley assembly further includes an idler pulley post protruding from the motor housing and through the motor face plate in the substantially same axial direction of the motor shaft, the idler pulley post being radially offset from the motor shaft. The pulley assembly yet further includes a housing flange having a pilot bore to accommodate at least a portion of the motor pilot and the idler pulley post.

6 Claims, 1 Drawing Sheet

(56) References Cited

U.S. PATENT DOCUMENTS

2020/0017138 A1* 1/2020 Kirchweger ............ F16H 55/36

OTHER PUBLICATIONS

English Translation of Office Action regarding corresponding DE App. No. 10 2021 120 932.3; dated Dec. 1, 2022.
Website "http://der-weniger.at/shop/motor-mit-spannrolle-p-1591.html"; Article photo. Copyright of the photo: 2011.

* cited by examiner

PULLEY SYSTEM FOR VEHICLE POWER STEERING SYSTEM

FIELD OF THE INVENTION

The following description relates to a vehicle power steering system and, more specifically, to a pulley system for such applications.

BACKGROUND

An idler includes a pulley that transmits no power but guides or tensions a belt. The pulley is rotatable about a shaft and rests on or presses against a drive belt to guide it or take up slack. In a vehicular application, an idler pulley can be used as part of a vehicle's pulley assembly to help regulate how the belts run from a motor shaft to generate movement in other parts and engine accessories. Thus, the belt can rest on the idler pulley as well as other pulleys. The idler pulley can be operatively arranged between a drive pulley and a driven pulley. Typically the idler post that connects to, or forms, the idler pulley is located inside of a rack housing.

SUMMARY OF THE DISCLOSURE

According to one aspect of the disclosure, a pulley assembly for a steering assembly includes a motor disposed within a motor housing and having a motor shaft extending therefrom. The pulley assembly also includes a motor face plate having a motor pilot component extending therefrom in the same direction as the motor shaft extends away from the motor, the motor shaft extending through a hole in the motor face plate. The pulley assembly further includes an idler pulley post protruding from the motor housing and through the motor face plate in the substantially same axial direction of the motor shaft, the idler pulley post being radially offset from the motor shaft. The pulley assembly yet further includes a housing flange having a pilot bore to accommodate at least a portion of the motor pilot and the idler pulley post.

According to another aspect of the disclosure, a pulley assembly for a steering assembly includes a motor having a motor shaft extending therefrom. The pulley assembly also includes an idler pulley post protruding from the motor in the substantially same axial direction of the motor shaft, the idler pulley post being radially offset from the motor shaft. The pulley assembly further includes a housing flange having a pilot bore to accommodate at least a portion of the motor pilot and the idler pulley post.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 2:
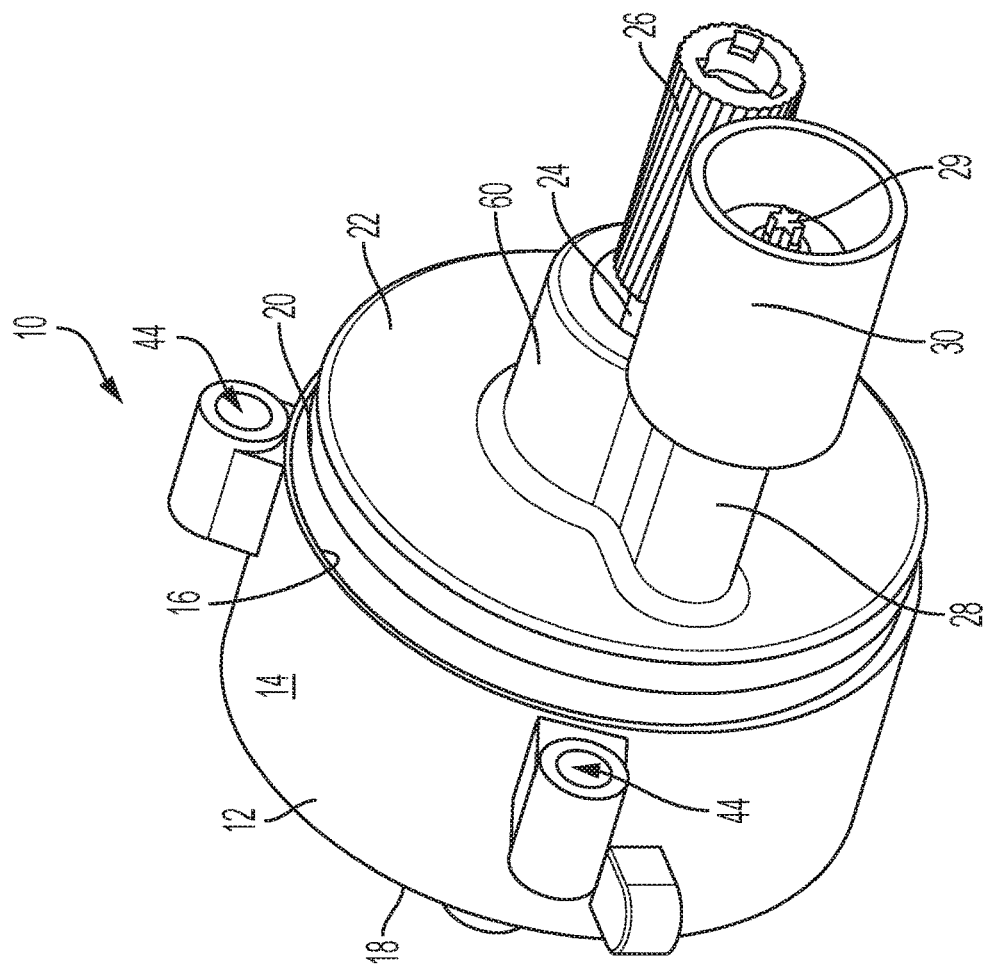
FIG. 2 is a motor assembly housing for the pulley system.
Figure 1:
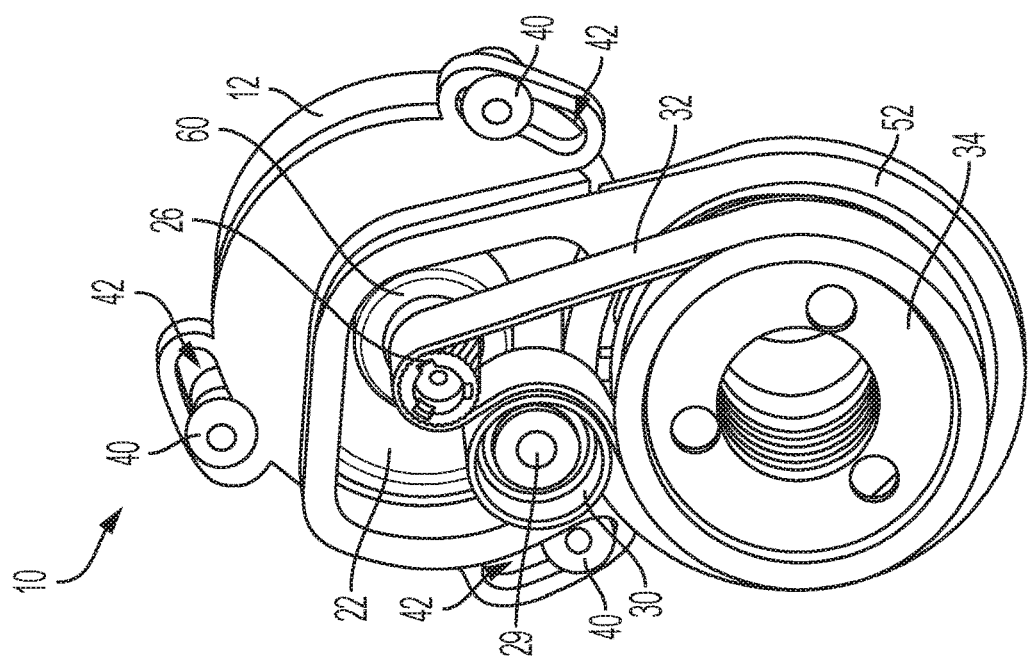
FIG. 1 is a perspective view of a pulley system for a vehicle power steering system.

Referring now to the Figures, where embodiments will be described, without limiting same, FIGS. 1 and 2 illustrate a pulley system 10 for a vehicle power steering system. The pulley system 10 includes a motor (not shown) disposed within a motor housing 12. The motor may be an electric motor, and may include a motor stator and a motor rotor. In one embodiment, the motor may be a direct current permanent magnet motor and a motor rotation sensor is secured thereto.

In the illustrated embodiment, the motor housing 12 is substantially cylindrical, as defined by a circumferential outer surface 14 that extends axially from a first end 16 to a second end 18. The first end 16 has a radial seal 20 and a motor face plate 22 operatively coupled thereto. A motor shaft 24 extends axially away from the motor and through motor face plate 22. The motor shaft 24 is rotated by the motor and rotates a drive pulley 26 operatively coupled thereto. The motor shaft 24 is positioned by a bearing set.

The motor housing 12 also includes an idler post 28 extending away from the motor and through the motor face plate 22 in the same direction as, but radially offset from (i.e., substantially parallel to), the motor shaft 24. The idler post 28 is therefore integrally formed with the motor—or motor casing. The idler post 28 has an idler pulley 30 operatively coupled thereto with attachment screw 29. The idler pulley 30 is arranged to tension a belt 32 that is in contact with the drive pulley 26, the idler pulley 30, and a driven pulley 34.

The motor housing 12 is secured to a housing flange 52 with a plurality of mechanical fasteners 40, such as screws, bolts or the like. In some embodiments, the illustrated housing flange 52 is only partially shown. The housing flange 52 is a flange/motor interface 52. The housing flange 52 is incorporated with (e.g., operatively coupled to) a housing hereafter referred to as rack housing. The overall rack housing houses a toothed rack engaged with a pinion. In other embodiments, the housing flange 52 may be part of a belt/pulley cover, which may be referred to as an assist cover.

The illustrated embodiment includes three mechanical fasteners 40, however an alternate number of mechanical fasteners 40 may be employed. The housing flange 52 includes a corresponding number of fastener receiving slots 42 for receiving the mechanical fasteners 40 therethrough. The motor housing 12 is aligned relative to the housing flange 52—and therefore the overall housing—by assembling the motor housing 12 to the housing upon insertion of a motor pilot 60 with a pilot receiving feature (e.g., pilot bore) of the housing flange 52.

The slots 42 may have an arcuate shape and a length. As illustrated, each of the mechanical fasteners 40 include a shank portion that extends through the slots 42 and into a respective receiving aperture 44 in the motor housing 12. The shank portion includes threads mated with threads in the receiving aperture in the motor housing 12 so that the mechanical fastener 40 can be threaded within the receiving apertures 44. The shank portion has a diameter that is less than a length of the slots 42. The mechanical fasteners 40 may be unthreaded partially from the receiving apertures 44 to allow relative rotational movement between the rack housing and the motor housing 12. The rotational movement of the motor housing 12 is limited by the length of the receiving slots 42, as the ends of the receiving slots 42 abut with the shank of the mechanical fasteners 40 if rotation of the motor housing is attempted past the shank.

Since the motor housing 12 carries the idler post 28, the idler pulley 30 may rotate (move/translate) no more than the length of the slot 42. Once a desired position of the idler pulley 30 is selected, the mechanical fasteners 40 can secure the motor housing 12 to the housing flange 52 at any location within the slots 42 for adjusting the contact pressure of the idler pulley 30 on the belt 32, thus adjusting the tensioning of the belt 32 as necessary.

After the motor, along with a portion of the motor housing 12 that includes the idler pulley 30 and motor shaft 24, is installed into the housing flange 52, the belt 32 is installed and routed around the drive pulley 26 and the driven pulley 34. The motor is then rotated, thereby forcing the idler pulley 30 into the belt 32 to define the overall belt tension.

The above-described embodiments may be incorporated into a number of different applications, such as, but not limited to, vehicular applications including an electric power steering system and an electric brake boost system.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A pulley assembly for a steering assembly comprising:
   a motor disposed within a motor housing and having a motor shaft extending therefrom;
   a motor face plate having a motor pilot component extending therefrom in the same direction as the motor shaft extends away from the motor, the motor shaft extending through a hole in the motor face plate;
   an idler pulley post protruding from the motor housing and through the motor face plate in the substantially same axial direction of the motor shaft, the idler pulley post being radially offset from the motor shaft, wherein the idler pulley post is integrally formed with the motor housing, wherein the idler pulley post has an idler pulley disposed on an end thereof, the idler pulley having a diameter larger than the idler pulley post; and
   a housing flange having a pilot bore to accommodate at least a portion of the motor pilot and the idler pulley post.

2. The pulley assembly of claim 1, wherein the motor shaft has a drive pulley disposed on an end thereof.

3. The pulley assembly of claim 2, wherein rotation of the motor and the idler post tensions a pulley belt to a predetermined tension.

4. The pulley assembly of claim 2, wherein the pulley assembly is disposed within a vehicle power steering assist system.

5. The pulley assembly of claim 4, wherein the vehicle power steering assist system is part of an electric power steering system.

6. The pulley assembly of claim 4, wherein the power assist system is part of a brake boost actuator.

* * * * *